(12) United States Patent
Kim et al.

(10) Patent No.: US 8,383,693 B2
(45) Date of Patent: Feb. 26, 2013

(54) AEROGEL, AND COMPOSITION AND METHOD FOR MANUFACTURING THE AEROGEL

(75) Inventors: Kwang-Hee Kim, Seoul (KR);
Myung-Dong Cho, Hwaseong-si (KR);
Sang-Ho Park, Yongin-si (KR);
Sung-Woo Hwang, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 220 days.

(21) Appl. No.: 12/880,896

(22) Filed: Sep. 13, 2010

(65) Prior Publication Data

US 2011/0201713 A1    Aug. 18, 2011

(30) Foreign Application Priority Data

Feb. 12, 2010    (KR) ........................ 10-2010-0013640

(51) Int. Cl.
*B32B 3/26* (2006.01)
*C08J 9/00* (2006.01)

(52) U.S. Cl. ................ 521/61; 521/63; 521/64; 521/77; 521/99; 521/142; 521/146; 521/147; 521/149

(58) Field of Classification Search .................... 521/61, 521/63, 64, 77, 99, 142, 146, 147, 149
See application file for complete search history.

(56) References Cited

U.S. PATENT DOCUMENTS

| | | | |
|---|---|---|---|
| 3,549,481 A | 12/1970 | Cesare et al. | |
| 4,873,218 A | 10/1989 | Pekala | |
| 4,966,919 A | 10/1990 | Williams, Jr. et al. | |
| 4,997,804 A | 3/1991 | Pekala | |
| 5,124,364 A | 6/1992 | Wolff et al. | |
| 5,137,927 A | 8/1992 | Wolff et al. | |
| 5,159,049 A | 10/1992 | Allen | |
| 5,389,288 A * | 2/1995 | Rindo et al. ............ | 252/299.01 |
| 5,420,168 A | 5/1995 | Mayer et al. | |
| 5,484,818 A | 1/1996 | De Vos et al. | |
| 5,508,341 A | 4/1996 | Mayer et al. | |
| 5,945,084 A | 8/1999 | Droege | |
| 5,948,879 A | 9/1999 | Mori et al. | |
| 5,990,184 A | 11/1999 | Biesmans | |
| 6,040,375 A | 3/2000 | Behme et al. | |
| 6,316,092 B1 | 11/2001 | Frank et al. | |
| 6,887,563 B2 | 5/2005 | Frank et al. | |
| 7,118,801 B2 | 10/2006 | Ristic-Lehmann et al. | |
| 7,282,466 B2 | 10/2007 | Long et al. | |
| 7,316,919 B2 | 1/2008 | Childs et al. | |
| 2001/0038933 A1 | 11/2001 | Gebhardt et al. | |
| 2002/0173554 A1 | 11/2002 | Baumann et al. | |
| 2004/0142149 A1 | 7/2004 | Mollendorf et al. | |
| 2005/0131089 A1 | 6/2005 | Kocon et al. | |
| 2007/0036959 A1 | 2/2007 | Yamato et al. | |
| 2007/0087120 A1 | 4/2007 | Connors, Jr. et al. | |
| 2007/0167534 A1 | 7/2007 | Coronado et al. | |
| 2007/0208124 A1 | 9/2007 | Schiraldi et al. | |
| 2007/0259169 A1 | 11/2007 | Williams et al. | |
| 2008/0087870 A1 | 4/2008 | Williams et al. | |
| 2008/0112876 A1 | 5/2008 | Dailey | |
| 2008/0188581 A1 | 8/2008 | Lee et al. | |
| 2008/0220333 A1 | 9/2008 | Yano et al. | |
| 2008/0287561 A1 | 11/2008 | Menashi et al. | |
| 2009/0029147 A1 | 1/2009 | Tang et al. | |
| 2009/0035344 A1 | 2/2009 | Thomas et al. | |
| 2010/0204347 A1 | 8/2010 | Park et al. | |
| 2011/0245361 A1 | 10/2011 | Kim et al. | |
| 2011/0311802 A1 | 12/2011 | Cho et al. | |

FOREIGN PATENT DOCUMENTS

| | | |
|---|---|---|
| CN | 101525248 B | 7/2012 |
| DE | 1964188 A1 | 7/1970 |
| EP | 0994912 A | 1/1994 |
| EP | 0995773 A2 | 4/2000 |
| JP | 4732742 A | 11/1972 |
| JP | 05-319899 A | 12/1993 |
| JP | 2000-119433 A | 4/2000 |
| JP | 2008132676 A | 6/2008 |
| JP | 2008-221385 A | 9/2008 |
| JP | 2008231258 A | 10/2008 |
| KR | 19967003975 A | 8/1996 |
| KR | 1019990044531 A | 6/1999 |
| KR | 10-0282964 B1 | 12/2000 |
| KR | 1020010017538 A | 3/2001 |
| KR | 1020040011915 A | 2/2004 |
| KR | 1020040106289 A | 12/2004 |
| KR | 1020050037557 A | 4/2005 |
| KR | 1020050073500 A | 7/2005 |
| KR | 1020050118119 A | 12/2005 |
| KR | 1020060099514 A | 9/2006 |

(Continued)

OTHER PUBLICATIONS

Al-Muhtaseb, S.A. et al., Preparation and Properties of Resorcinol-Formaldehyde Organic and Carbon Gels, Advanced Materials, 15,101-114 (2003).

Aoki, H. et al., Basic Study of the Gelation of Dimethacrylate-Type Crosslinking Agents, J. of Polymer Sci Part A: Polymer Chem, 2006, 44: 949-958.

Chowdhury, R., Electron-Beam-Induced Crosslinking of Natural Rubber/Acrylonitrile-Butadiene Rubber Latex Blends in the Presence of Ethoxylated Pentaerythritol Tetraacrylate Used as a Crosslinking Promoter, J. of Applied Polymer Sci, 2007, vol. 103, No. 2, 1206-1214.

(Continued)

*Primary Examiner* — Irina S Zemel
(74) *Attorney, Agent, or Firm* — Cantor Colburn LLP (57) ABSTRACT

An aerogel including a polymeric reaction product of (a) a first monomer including an aromatic compound having at least two unsaturated functional groups, and (b) a second monomer represented by the following Chemical Formula 1 and including at least two groups independently chosen from (meth)acrylate groups and NR"R' (where R" and R' are the same or different and are (meth)acryloyl groups) is provided.

Chemical Formula 1

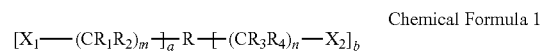

Each substituent is as defined in the specification.

21 Claims, 2 Drawing Sheets

FOREIGN PATENT DOCUMENTS

| | | |
|---|---|---|
| KR | 10-0666110 B1 | 1/2007 |
| KR | 1020090059321 A | 6/2009 |
| KR | 1020090061301 A | 6/2009 |
| KR | 10-0911845 B | 8/2009 |
| WO | 96/26915 A1 | 9/1996 |
| WO | 2008104491 A1 | 9/2008 |
| WO | 2008114524 A1 | 9/2008 |
| WO | 2009/033070 A1 | 3/2009 |

OTHER PUBLICATIONS

Gu, W. et al., Polymerized Gels and 'Reverse Aerogels' from Methyl Methacrylate or Styrene and Tetraoctadecylammonium Bromide as Gelator, Chem. Commun. 1997, 6, pp. 543-544.

Hüsing et al., Aerogels—Airy Materials: Chemistry, Structure, and Properties, Angew. Chem. Int. Ed. 1998, 37, 22-45.

Kaczmarek, H. et al., Networks of Photocrosslinked Poly(meth)acrylates in Linear Poly(vinyl chloride), Networks of , J. Appl. Polym. Sci., 2002, 86, 375-3734.

Mulik, S. et al, Cross-Linking 3D Assemblies of Nanoparticles into Mechanically Strong Aerogels by Surface-Initiated Free-Radical Polymerization, Chem. Mater., 2008, 20 (15), 5035-5046.

Paguio, R.R. et al., Fabrication Capabilities for Spherical Foam Targets Used in ICF Experiments,17th Target Fabrication Specialist Meeting, San Diego, CA, Oct. 1-5, 2006. Also published on IEEE Xplore.

European Extended Search Report—EP 10191930.6 dated May 11, 2011.

Aaltonen, O. et al., The preparation of lignocellulosic aerogels from ionic liquid solutions, Carbohydrate Polymers, 2009, vol. 75: 125-129.

Capadona, L. A. et al., Flexible, Low-Density Polymer Crosslinked Silica Aerogels. Polymer, 2006; vol. 47: 5754-5761.

EP Extended Search Report for Application No. 11170821.0 dated Nov. 30, 2011.

EP Search Report for Application No. 11158144.3 dated Jul. 29, 2011. All references listed above are cited therein.

Feldmann C., "Polyol-Medicated Synthesis of Nanoscale Functional Materials", Advanced Functional Materials, 2003, vol. 13(2): 101-107.

Fischer, F. et al., Cellulose-based aerogels, Polymer, 2006, vol. 47: 7636-7645.

Gavillon, R. et al., Aerocellulose: New Highly Porous Cellulose Prepared from Cellulose-NaOH Aqueous Solutions, Biomacromolecules, 2008, vol. 9: 269-277.

Hebb, A. et al., Synthesis of porous cross-linked polymer monoliths using 1,1,1,2-tetrafluoroethane (R134a) as the porogen, Composites Science and Technology, 2003, vol. 63: 2379-2387.

Hoepfner, S. et al., Synthesis and characterisation of nanofibrillar cellulose aerogels, Cellulose, 2008, vol. 15: 121-129.

Iler, R.K.,1978. "The Chemistry of Silica", John Wiley & Sons, New York.

Innerlohinger, J. et al., Aerocellulose: Aerogels and Aerogel-like Materials made from Cellulose, Macromol. Symp., 2006, vol. 244: 126-135.

Jin, H. et al., Nanofibrillar cellulose aerogels, Colloids and Surfaces A: Physicochem. Eng. Aspects, 2004, vol. 240(1-3): 63-67.

Jirglova, H. et al., Synthesis and Properties of Phloroglucinol-Phenol-Formaldehyde Carbon Aerogels and Xerogels, Langmuir, 2009; 25(4): 2461-2466.

Kanamori, K. et al., New Transparent Methylsilsesquioxane Aerogels and Xerogels with Improved Mechanical Properties, Advanced Materials, 2007, vol. 19(12): 1589-1593.

Katanyoota, P. et al., Novel polybenzoxazine-based carbon aerogel electrode for supercapacitors, Materials Science and Engineering: B, 2010, vol. 167(1): 36-42.

Leventis, N. et al., Nanoengineering Strong Silica Aerogels, Nano Letters, 2002, vol. 2 (9): 957-960.

Leventis, N., Three-Dimensional Core-Shell Superstructures: Mechanically Strong Aerogels, Acc. Chem. Res. 2007, 2007, 40 (9): 874-884.

Liebner, F. et al., Cellulose aerogels: highly porous, ultra-lightweight materials, Holzforschung, 2008, vol. 62: 129-135.

Liebner, F. et al., Cellulosic aerogels as ultra-lightweight materials. Part 2: synthesis and properties, Holzforschung, 2009, vol. 63: 3-11.

Long, D. et al. "Molecular design of polymer precursors for controlling microstructure of organic and carbon aerogels", Journal of Non-Crystalline Solids, 2009,: vol. 355(22-23): 1252-1258.

Lorjai, P. et al., "Porous Structure of Polybenzoxazine-based organic aerogel prepared by sol-gel process and their carbon aerogels", J Sol-Gel Sci Technol, 2009, vol. 52(1): 56-64.

Mulik, S. et al., Time-Efficient Acid-Catalyzed Synthesis of Resorcinol-Formaldehyde Aerogels, Chem. Mater., 2007, 19, pp. 5138-6144.

Pekala, R. W. et al., "Structure of organic aerogels 1. Morphology and scaling", Macromolecules 26 (1993): 5487-5493.

Pekala, R.W. "Organic aerogels from the polycondensation of resorcinol with formaldehyde", Journal of Materials Science, 1989, 24(9): 3221-3227.

Rozenberg, B.A. et al., "High-performance Bismaleimide Matrices: Cure Kinetics and Mechanism" Polymers for Advanced Technologies, 2002, vol. 13 (10-12): 837-844.

Science Magazine, Editor's Choice Section, "Materials Science Spongy Clay?", Oct. 21, 2005, vol. 310; 5747: 407c.

Tan, C. et al., Organic Aerogels with Very High Impact Strength, Advanced Materials, 2001, vol. 13 (9): 644-646.

Wiener, M. et al., "Carbon Aerogel-Based High-Temperature Thermal Insulation", Int J. Thermophys, 2009, vol. 30 (4):1372-1385.

Chaisuwan, T. et al., "Novel Carbon Aerogel Prepared from Benzoxazine Precursors via Ambient Drying: Effect of Amine Derivatives", PMSE Preprints, vol. 100, Spring 2009, 3 pages.

Chaisuwan, T. et al., "Removal of heavy metals from model wastewater by using polybenzoxazine aerogel", Desalination 256 (2010), pp. 108-114.

Katanyoota, P., et al., "Novel polybenzoxazine-based carbon aerogel electrode for supercapacitors," Materials Science and Engineering B, vol. 167, 2010, pp. 36-42.

Komalwanich, T. et al., "Removal of Heavy Metals from Wastewater by Polybenzoxazine-based Aerogel", PMSE Preprints, vol. 100, Spring 2009, 3 pages.

Yang, J. et al., "Compressive behaviors and morphological changes of resorcinol-formaldehyde aerogel at high strain rates", Microporous and Mesoporous Materials, vol. 133, 2010, pp. 134-140.

* cited by examiner

AEROGEL, AND COMPOSITION AND METHOD FOR MANUFACTURING THE AEROGEL

CROSS-REFERENCE TO RELATED APPLICATION

This application claims priority to Korean Patent Application No. 10-2010-0013640 filed on Feb. 12, 2010, and all the benefits accruing therefrom under 35 U.S.C. §119, the content of which in its entirety is herein incorporated herein by reference.

BACKGROUND

1. Field

This disclosure relates to an aerogel, a composition for manufacture of the aerogel, and a method of manufacturing the aerogel.

2. Description of the Related Art

An aerogel is a microporous material having a three-dimensional mesh structure with nanometer scale pores. Aerogels typically exhibit insulating and energy-absorbing properties, and may be used in a variety of applications. For example, aerogels may be used in cooling devices such as refrigerators and freezers, and as insulating materials for the aerospace industry and building construction.

Aerogels may be classified as inorganic or organic, according to the materials used to prepare the aerogel. An example of an inorganic aerogel is a silica aerogel. An organic aerogel includes an organic linking group, and thus is generally more flexible than an inorganic aerogel.

SUMMARY

An organic aerogel may have various properties, which vary according to its chemical structure and method of manufacture.

An embodiment of this disclosure provides an aerogel having improved properties.

Another embodiment of this disclosure provides a composition for use in manufacturing the aerogel.

A further embodiment of this disclosure provides a method of manufacturing the aerogel.

According to an embodiment of this disclosure, an aerogel is provided that includes a polymer, wherein the polymer is a reaction product of:
one or more first monomers, wherein each first monomer includes an independently chosen aromatic compound having at least two unsaturated functional groups, and
one or more second monomers, wherein each second monomer includes at least two groups independently chosen from (meth)acrylate groups and NR"R' (where R" and R' are the same or different, and are (meth)acryloyl groups).

Within certain embodiments, the one or more second monomers are independently represented by the following Chemical Formula 1, Chemical Formula 1

In the above Chemical Formula 1, each $X_1$ and $X_2$ is independently a (meth)acrylate group or NR"R', where R" and R' are the same or different and are (meth)acryloyl groups, R is a substituted or unsubstituted C1 to C30 alkylene group, a substituted or unsubstituted C6 to C30 arylene group, or a substituted or unsubstituted C2 to C30 heteroarylene group, each $R_1$, $R_2$, $R_3$, and $R_4$ is independently hydrogen, a substituted or unsubstituted C1 to C10 alkyl group, a substituted or unsubstituted C1 to C10 alkoxy group, $NR_xR_y$, $OR_x$, $NH(CO)R_x$, $OCOR_x$, a substituted or unsubstituted C6 to C18 aryl group, for example a phenyl group, or $CH=CR_x$, wherein each $R_x$ and $R_y$ is independently hydrogen or a substituted or unsubstituted C1 to C10 alkyl group, each m and n is independently an integer ranging from 0 to about 20, provided that when R is an arylene group or a heteroarylene group, each m and n is independently an integer ranging from 3 to about 20, and a and b are independently integers ranging from 0 to 4, provided that a+b is determined by the valance of R and is 2 or more.

According to another embodiment of this disclosure, a composition for manufacturing an aerogel is provided that includes:
one or more first monomers that include an aromatic compound having at least two unsaturated functional groups,
one or more second monomers that include at least two groups independently chosen from (meth)acrylate groups and NR"R' (where R" and R' are the same or different, and are (meth)acryloyl groups), and
a solvent.

According to yet another embodiment of this disclosure, a method of making an aerogel is provided, that includes:
mixing one or more first monomers, wherein each first monomer includes an independently chosen aromatic compound having at least two unsaturated functional groups, and one or more second monomers, wherein each second monomer includes at least two groups independently chosen from (meth)acrylate groups and NR"R' (where R" and R' are the same or different, and are (meth)acryloyl groups) in a solvent to obtain a mixture,
reacting the mixture to obtain a wet gel, and
drying the wet gel.

In certain representative embodiments of the aerogel, composition and method described above, the aromatic compound(s) having at least two unsaturated functional groups may be an aromatic compound including at least one double-bond-containing functional group (e.g., an alkenyl or a (meth) acrylate group) and/or at least one triple-bond-containing functional group.

Representative double-bond-containing functional groups include a substituted or unsubstituted C2 to C10 alkenyl group, such as an allyl group, and the like. Representative triple-bond-containing functional groups include a C2 to C10 alkynyl group.

In further embodiments, the aromatic compound may include a compound represented by the following Chemical Formula 2.

Chemical Formula 2

In the above Chemical Formula 2,
Ar is a substituted or unsubstituted C6 to C30 arylene group, a substituted or unsubstituted C3 to C30 heteroarylene group, a group including at least two substituted or unsubstituted C6 to C30 arylene groups linked by a single bond or a linker or a group including at least two substituted or unsubstituted C3 to C30 heteroarylene groups linked by a single bond or a linker, each $Y_1$ and $Y_2$ is independently a double-bond-containing functional group (e.g., a (meth)acrylate group) or a triple-bond-containing functional group, and each of p and q is independently an integer ranging from 1 to 5 and p+q is determined by the valance of Ar.

Representative examples of the second monomer include: alkylene di(meth)acrylates such as ethylene di(meth)acrylate; alkanol penta(meth)acrylates such as glycerol (meth) acrylate, 1,4-butanediol (meth)acrylate, 1,6-hexamethylol (meth)acrylate, trimethylolpropyl (meth)acrylate, pentaerythritol tri(meth)acrylate, pentaerythritol tetra(meth) acrylate, dipentaerythritol penta(meth)acrylate, and dipentaerythritol hexa(meth)acrylate; N,N'-alkylene-bis-(meth) acrylamides such as N,N'-methylene-bis-(meth)acrylamide, and N,N'-ethylene-bis-(meth)acrylamide, and the like.

In further representative embodiments, the first monomer(s) and the second monomer(s) may be used in a weight ratio ranging from about 10:90 to about 90:10.

In further representative embodiments, the aerogel may have pores having a size ranging from about 1 nm to about 100 nm (e.g., 2 nm to 50 nm), and may have porosity of about 80 to about 99% based on the total volume of the aerogel. The specific surface area of the aerogel may range from about 200 $m^2/g$ to about 1000 $m^2/g$.

Within certain representative embodiments of the compositions and methods described above, the solvent may include an organic solvent, such as dimethyl formamide ("DMF"), acetone, 1,4-dioxane, tetrahydrofuran, dimethyl sulfoxide, toluene, benzene, dichlorobenzene, acetonitrile, alcohol, or a combination comprising at least one of the foregoing.

DETAILED DESCRIPTION

This disclosure will be described more fully hereinafter in the following detailed description, and with reference to the accompanying drawings, in which some but not all embodiments of the disclosure are described. This disclosure may, however, be embodied in many different forms and is not to be construed as limited to the exemplary embodiments set forth herein; rather, these embodiments are provided so that this disclosure will be thorough and complete, and will fully convey the scope of the invention to those skilled in the art. Like reference numerals and variables refer to like elements throughout.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs.

As used herein, when a definition is not otherwise provided, the term "substituted" refers replacement of one or more hydrogens (e.g., 1, 2, 3, 4, 5, or 6 hydrogens) in a compound with one or more substituents independently selected from a C1 to C30 alkyl group, a C2 to C30 alkenyl group, a C2 to C30 alkynyl group, a C6 to C30 aryl group, a C7 to C30 arylalkyl group, a C1 to C4 alkoxy group, a C1 to C30 heteroalkyl group, a C3 to C30 heteroaryl group, a C3 to C30 heteroarylalkyl group, a C3 to C30 cycloalkyl group, a C3 to C15 cycloalkenyl group, a C6 to C30 cycloalkynyl group, C2 to C30 heterocycloalkyl group, a halogen (F, Cl, Br, or I), a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group, or a salt thereof, a sulfonic acid group or a salt thereof, and a phosphoric acid or a salt thereof.

An "alkyl" group is a straight or branched chain saturated aliphatic hydrocarbon. Alkyl groups include, for example, groups having from 1 to 30 carbon atoms ("C1 to C30 alkyl"). "Alkenyl" is a straight or branched chain hydrocarbon that comprises at least one carbon-carbon double bond; and "alkynyl" refers to a straight or branched chain hydrocarbon that has one or more unsaturated carbon-carbon bonds, at least one of which is a triple bond.

A "cycloalkyl" group comprises one or more saturated rings in which all ring members are carbon, such as cyclopropyl, cyclobutyl, cyclopentyl, cyclohexyl, cycloheptyl, cyclooctyl, and adamantyl. Partially saturated variants of the foregoing are referred to herein as cycloalkenyl groups (which comprise at least one carbon-carbon double bond, such as cyclohexenyl) or cycloalkynyl groups (which comprise at least one carbon-carbon triple bond). Cycloalkyl, cycloalkenyl, and cycloalkynyl groups do not comprise an aromatic ring or a heterocyclic ring. When numbers of carbon atoms are specified (e.g., C3-C15 cycloalkyl), such numbers refer to the number of ring members present in the one or more rings.

A "heteroalkyl" group is an alkyl group that comprises at least one heteroatom covalently bonded to one or more carbon atoms of the alkyl group. Each heteroatom is independently chosen from nitrogen (N), oxygen (O), sulfur (S), and phosphorus (P).

An "alkoxy" group is a type of heteroalkyl group, in particular an alkyl moiety that is linked via an oxygen (i.e., —O-alkyl). Nonlimiting examples of C1-C30 alkoxy groups include methoxy groups, ethoxy groups, propoxy groups, isobutyloxy groups, sec-butyloxy groups, pentyloxy groups, iso-amyloxy groups, and hexyloxy groups.

A "heterocycloalkyl" group is a monovalent group that comprises one or more rings, none of which is aromatic, and at least one of which comprises at least one heteroatom (e.g., one, two, or three heteroatoms) as a ring member. In a C2-C30 heterocycloalkyl group, the total number of carbon ring members ranges from 2 to 30, with remaining ring members independently chosen from nitrogen (N), oxygen (O), sulfur (S), and phosphorus (P).

A "C6-C30 aryl group" is a monovalent carbocyclic ring system that includes one or more aromatic rings, in which all ring members are carbon, and in which the total number of ring atoms ranges from 6 to 30. Multiple rings, if present, may be pendent, spiro or fused. Representative aryl groups include, for example, phenyl, naphthyl, and tetrahydronaphthyl groups.

An "alkylaryl" group is an aryl group linked via an alkylene moiety. The specified number of carbon atoms (e.g., C7 to C30) refers to the total number of carbon atoms present in both the aryl and the alkylene moieties. Representative alkylaryl groups include, for example, benzyl groups.

A "heteroaryl" group is a monovalent carbocyclic ring system that includes one or more aromatic rings, in which at least one ring member (e.g., one, two or three ring members) is a heteroatom. In a C3 to C30 heteroaryl, the total number of ring carbon atoms ranges from 3 to 30, with remaining ring atoms being heteroatoms. Multiple rings, if present, may be pendent, spiro or fused. The heteroatom(s) are generally independently selected from nitrogen (N), oxygen (O), P (phosphorus), and sulfur (S).

A "heteroarylalkyl" group is a heteroaryl group linked via an alkylene moiety. The specified number of carbon atoms (e.g., C3 to C30) refers to the total number of carbon atoms present in both the aryl and the alkylene moieties, with remaining ring atoms being heteroatoms as discussed above.

A "linker" as used herein means a divalent chemical group that links two moieties and can broadly include a wide variety of carbon- and/or heteroatom-containing groups, provided that such groups do not substantially adversely impact the intended use of the compound containing the linker. Exemplary linkers include a C1 to C12 alkylene, a C4-C12 cycloalkylene, a C7-C30 alkylarylene, a C7-C30 arylalkylene, a C6 to C12 arylene, —O—, —S—, or —C(O)—. In a specific embodiment the linker is a C1 to C16 alkylene, —O—, —S—, or —C(O)—.

Throughout the specification, reference is made to various bivalent moieties. Such moieties are the same as the monovalent groups that are similarly named, and are typically indicated with an "ene" suffix. For example, a C1 to C30 alkylene group is a bivalent linking group having the same structure as a C1 to C30 alkyl group, a C6 to C30 arylene group is a bivalent linking group having the same structure as a C6 to C30 aryl group, and a C1 to C30 heteroalkylene group is a bivalent linking group having the same structure as a C1 to C30 heteroalkyl group.

As used herein, the term "aerogel" refers to an ambigel, a xerogel, a cryogel, and the like.

In addition, the term (meth)acrylate group refers to an acrylate group or a methacrylate group, and the term (meth)acryloyl group refers to an acryloyl group or a methacryloyl group.

Hereinafter, an organic aerogel according to one embodiment is described.

The aerogel according to one embodiment is an organic aerogel including a polymer having a plurality of mesopores.

The polymer is a product of a polymerization reaction of one or more first monomers that include an aromatic compound having at least two unsaturated functional groups, and one or more second monomers that include at least two groups independently chosen from (meth)acrylate groups and NR"R' (where R" and R' are the same or different, and are (meth)acryloyl groups). In certain representative embodiments, the polymer is a reaction product of one first monomer and one second monomer, as defined above.

In certain representative embodiments, the aromatic compound having at least two unsaturated functional groups includes at least one double-bond-containing functional group (e.g., an alkenyl group or a (meth)acrylate group) and/or at least one triple-bond-containing functional group.

Representative double-bond-containing functional groups include a substituted or unsubstituted C2 to C10 alkenyl group, such as an allyl group, and the like; a nonlimiting example of the alkenyl group is a vinyl group.

In further representative embodiments, the aromatic compound may include a compound represented by the following Chemical Formula 2.

$(Y_1)_p$—$(Ar)$—$(Y_2)_q$          Chemical Formula 2

In the above Chemical Formula 2,

Ar is a substituted or unsubstituted C6 to C30 arylene group, a substituted or unsubstituted C3 to C30 heteroarylene group, a group including at least two substituted or unsubstituted C6 to C30 arylene groups linked by a single bond or a linker or a group including at least two substituted or unsubstituted C3 to C30 heteroarylene groups linked by a single bond or a linker, each $Y_1$ and $Y_2$ is independently a double-bond-containing functional group (e.g., a (meth)acrylate group) or a triple-bond-containing functional group, and each of p and q is independently an integer ranging from 1 to 5, and p+q is determined by the valance of Ar.

According to another representative embodiment, in the above Chemical Formula 2, Ar may be a substituted or unsubstituted C6 to C18 arylene group, or a substituted or unsubstituted C3 to C10 heteroarylene group.

Nonlimiting examples of Ar include phenylene, biphenylene, naphthalene, anthracene, phenanthrene, rubrene, pentacene, pyrene, and the like.

Within further representative embodiments, the second monomer including at least two groups independently chosen from (meth)acrylate groups and NR"R' (where R" and R' are the same or different, and are (meth)acryloyl groups) may be represented by the following Chemical Formula 1.

Chemical Formula 1

In the above Chemical Formula 1, each $X_1$ and $X_2$ is independently a (meth)acrylate group or NR"R' (wherein R" and R' are the same or different, and are (meth)acryloyl groups), R is a substituted or unsubstituted C1 to C30 alkylene group, a substituted or unsubstituted C6 to C30 arylene group, or a substituted or unsubstituted C2 to C30 heteroarylene group; in a representative embodiment, R is a substituted or unsubstituted C1 to C10 alkylene group, a substituted or unsubstituted C6 to C18 arylene group, or a substituted or unsubstituted C2 to C10 heteroarylene group, each $R_1$, $R_2$, $R_3$, and $R_4$ is independently hydrogen, a substituted or unsubstituted C1 to C10 alkyl group, a substituted or unsubstituted C1 to C10 alkoxy group, $NR_xR_y$, $OR_x$, $NH(CO)R_x$, $OCOR_x$, a substituted or unsubstituted C6 to C18 aryl group such as a phenyl group, or $CH=CR_x$, wherein each $R_x$ and $R_y$ is independently hydrogen or a substituted or unsubstituted C1 to C10 alkyl group, each m and n is independently an integer ranging from 0 to about 20, provided that when R is an arylene group or a heteroarylene group, each m and n is independently an integer ranging from 3 to about 20, and a and b are independently integers ranging from 0 to 4, provided that a+b is determined according to a valance of R and is an integer of 2 or more. In certain representative embodiments, a+b may be an integer ranging from 3 to 6.

Nonlimiting examples of the second monomer include: alkylene di(meth)acrylates such as ethylene di(meth)acrylate; alkanol penta(meth)acrylates such as glycerol (meth)acrylate, 1,4-butanediol (meth)acrylate, 1,6-hexamethylol (meth)acrylate, trimethylolpropyl (meth)acrylate, pentaerythritol tri(meth)acrylate, pentaerythritol tetra(meth)acrylate, dipentaerythritol penta(meth)acrylate, and dipentaerythritol hexa(meth)acrylate; and N,N'-alkylene-bis-(meth)acrylamides such as N,N'-methylene-bis-(meth)acrylamide, N,N'-ethylene-bis-(meth)acrylamide, and the like. Representative alkylenes include, for example, C1 to C10 alkylene, and representative alkanols include, for example, C2 to C10 alkanol.

Further representative examples of the second monomer include ethylene di(meth)acrylate, glycerol (meth)acrylate, 1,4-butanediol (meth)acrylate, 1,6-hexamethylol (meth) acrylate, trimethylolpropyl (meth)acrylate, pentaerythritol tri (meth)acrylate, pentaerythritol tetra(meth)acrylate, dipentaerythritol penta(meth)acrylate, dipentaerythritol hexa (meth)acrylate, and the like.

Within other representative embodiments, the first monomer(s) and the second monomer(s) may be used in the polymerization reaction in a weight ratio ranging from about 10:90 to about 90:10, and in another representative embodiment, they may be used in a weight ratio ranging from about 60:40 to about 70:30. When the first monomer and the second monomer are used within such a range, a compact cross-linking network structure may be formed, resulting in desirable levels of strength and shrinkage.

Without wishing to be bound by theory, the first monomer may form an aerogel that has a micropore structure with a large specific surface area and that exhibits minimal contraction. Contraction may further be controlled by increasing the degree of cross-linking. The second monomer may provide further mechanical strength to an aerogel, while inducing a certain amount of contraction and controlling a fine pore structure.

In certain embodiments, the aerogel includes a plurality of pores having a size ranging from about 1 nm to about 100 nm (e.g., from 2 nm to 50 nm), and may have porosity ranging from about 80% to about 99% (e.g., from 90% to 99%) based on the total aerogel volume. The aerogel typically has a specific surface area ranging from about 200 $m^2/g$ to about 1000 $m^2/g$. When the aerogel has a pore size, porosity, and specific surface area within these ranges, the aerogel may exhibit excellent insulating and energy-absorbing properties.

The aerogel may be fabricated by drying a wet gel prepared by polymerizing first and second monomers, resulting in a microstructure forming branch-shaped clusters from a plurality of pores, and high structural strength and flexibility. Due to this high structural strength and flexibility, the pores do not collapse during aerogel preparation, allowing the formation of a predetermined pore size and an aerogel with a high specific surface area and insulating properties.

Hereinafter, a representative method of preparing the above aerogel is described.

The aerogel is prepared as a wet gel by polymerizing a composition for manufacturing an aerogel.

The composition for manufacturing an aerogel may be a solution obtained by mixing one or more first monomers that include an aromatic compound having at least two unsaturated functional groups and one or more second monomers that include at least two groups independently chosen from (meth)acrylate groups and NR"R' (wherein R" and R' are the same or different and are (meth)acryloyl groups) in a solvent.

The first monomer(s) and the second monomer(s) are essentially as described above.

The composition for manufacturing an aerogel may optionally include a catalyst. The catalyst may, within certain embodiments, be used in an amount ranging from about 0.1 to about 5 parts by weight based on 100 parts by weight of a monomer. Representative catalysts include, for example, a thermal catalyst that is decomposed by heat, and a photo-initiated catalyst producing a radical decomposed by rays such as UV. Nonlimiting examples of thermal catalysts include an azo compound catalyst such as azobisisobutyronitrile ("AIBN"), or a peroxide catalyst such as an organic peroxide (e.g., benzoyl peroxide) or an inorganic peroxide.

Representative solvents include, for example, organic solvents such as, dimethyl formamide, acetone, 1,4-dioxane, tetrahydrofuran, dimethyl sulfoxide, toluene, benzene, dichlorobenzene, acetonitrile, alcohol, or a combination comprising at least one of the foregoing.

The amount of the solvent used may vary according to the target density of an aerogel, and may be readily determined by those of ordinary skill in the art.

The composition for manufacturing an aerogel may optionally further include an initiator. In certain representative embodiments, the initiator may be a radical initiator (i.e., any compound capable of generating radicals, such as ammonium persulfate).

A polymer may be obtained through a radical reaction of the composition for manufacturing an aerogel, resulting in polymerization of the first and second monomers. An aerogel may then be obtained by sol-gel reaction.

The wet gel may undergo a solvent exchange reaction. The solvent used in the solvent exchange reaction may include any solvent having good miscibility with liquid carbon dioxide, without limitation. For example, acetone, 1,4-dioxane, tetrahydrofuran, ethanol, methanol, isopropanol, and the like may be used. However, if the wet gel is dried under atmospheric pressure or the solvent used during preparation of the wet gel has sufficient compatibility with carbon dioxide, any solvent exchange process may be omitted.

Subsequently, the wet gel is dried. The drying is performed, for example, by supercritical drying, atmospheric pressure drying, freeze drying (i.e., subcritical drying or reduced pressure drying), or a combination thereof.

Supercritical drying uses supercritical carbon dioxide. First, liquid carbon dioxide is supplied to a high-pressure reactor to remove solvent in a wet gel. Then, the temperature and pressure of the high-pressure reactor are raised over the threshold point of carbon dioxide, and the carbon dioxide is slowly ejected (e.g., vented) under reduced pressure. Supercritical drying with liquid carbon dioxide may be performed at a temperature slightly above room temperature (e.g., at about 31° C. or above), and is both safe and easy to perform.

Atmospheric pressure drying method involves drying the wet gel by heating at atmospheric pressure. When the solvent is removed through the atmospheric pressure drying method the resultant product is called xerogel, which is a type of aerogel.

Freeze drying (i.e., reduced pressure drying) is a method of removing solvent by freezing the wet gel including a solvent (e.g., an aqueous solution) and reducing the pressure to sublimate frozen solvent (e.g., ice). When the solvent is removed by freeze drying, the resultant product is called cryogel, which is a type of aerogel.

The aerogel according to a representative embodiment undergoes negligible shrinkage during a solvent exchange and drying process and maintains pores after drying.

When the second monomer including a at least two groups independently chosen from (meth)acrylate groups and NR"R' (where R" and R' are the same or different, and are (meth) acryloyl groups) is used during polymerization in the absence of first monomer, the sol-gel reaction and aging generally require more than 10 days, which is impractical for a large-scale manufacturing process. In addition, severe shrinkage may occur during the sol-gel reaction and drying process, and sufficient mechanical strength may not be obtained. The inclusion of the first monomer decreases the time required for sol-gel reaction and aging to a time more suited to large-scale manufacture (e.g., to within 24 hours), and shrinkage may be decreased.

Since the aerogel has excellent insulating properties and energy-absorbing properties, it may be used in a variety of applications, including within a cooling device such as a refrigerator or a freezer, as an insulating material for the aerospace industry, in cryogenic storage such as for liquid natural gas (LNG) and freight vessels, and as an adiabatic (insulating) material for piping, buildings, and construction. The aerogel may further be used as an adiabatic fabric for clothing and shoes, as a catalyst carrier, and as a sound absorption material or a vibration reduction material. Also, through pyrolysis, the aerogel may be converted to a carbon aerogel and may be used as an electrode material.

Hereinafter, this disclosure is illustrated in more detail with reference to examples. However, they are exemplary embodiments of this disclosure and are not limiting.

PREPARATION OF AEROGELS

Example 1

26 g of divinylbenzene ("DVB") and 4 g of pentaerythritol tetraacrylate are dissolved in 250 ml of N-methylpyrrolidone ("NMP"), 0.9 g of azobisisobutyronitrile ("AIBN") is added as a radical initiator, and then the resultant solution is agitated well. The solution is poured into a 130×130×40 mm TEFLON® (tetrafluoroethylene) mold and allowed to stand in an oven at 80° C. for 6 hours to obtain a cured wet gel. The wet gel is placed in a methanol tank, and then liquid $CO_2$ is used as a supercritical solvent to perform solvent exchange. The resulting gel is dried at about 40° C. to prepare a representative aerogel.

Example 2

A representative aerogel is prepared according to the same process as in Example 1, except that 28 g of DVB and 8 g of pentaerythritol tetraacrylate are used.

Example 3

A representative aerogel is prepared according to the same process as in Example 1, except that 18 g of DVB and 12 g of pentaerythritol tetraacrylate are used.

Example 4

A representative aerogel is prepared according to the same process as in Example 1, except that 14 g of DVB and 16 g of pentaerythritol tetraacrylate are used.

Example 5

A representative aerogel is prepared according to the same process as in Example 1, except that 39 g of DVB and 6 g of pentaerythritol tetraacrylate are used.

Example 6

A representative aerogel is prepared according to the same process as Example 1, except that 22 g of DVB and 8 g of ethylene glycol dimethacrylate ("EGDMA") are used.

Comparative Example 1

30 g of DVB is dissolved in 250 ml of NMP, 0.9 g AIBN radical initiator is added, and the mixture is agitated well. The solution is poured into a 130×130×40 mm TEFLON® (tetrafluoroethylene) mold and allowed to stand in an oven at 80° C. for 6 hours to obtain a cured wet gel. The wet gel is placed in a methanol tank, and then liquid $CO_2$ is used as a supercritical solvent to perform solvent exchange. The resulting gel is dried at about 40° C. to prepare an aerogel.

Comparative Example 2

30 g of pentaerythritol tetraacrylate is dissolved in 250 ml of NMP, 0.9 g of AIBN radical initiator is added, and the mixture is agitated well. The solution is poured into a 130×130×40 mm TEFLON® (tetrafluoroethylene) mold and allowed to stand in an oven at 80° C. for 6 hours to obtain a cured wet gel. The wet gel is placed in a methanol tank, in which methanol is used as a supercritical solvent to perform solvent exchange, and the gel is dried to prepare an aerogel.

The representative aerogels prepared according to Examples 1 to 6 and the aerogels of Comparative Examples 1 and 2 are evaluated with respect to density, total pore volumes, specific surface areas, thermal conductivity, and linear shrinkage. The results are shown in Table 1.

The total pore volumes are measured using the BET method (Brunauer, Emmett and Teller, *J. Am. Chem. Soc.*, 1938, 60:309), and specific surface areas are measured with a specific surface analyzer, TriStar3200 (Micromeritics Instruments, USA), at 77K. The thermal conductivity is measured with a heat flow meter (HFM 436) manufactured by Netzsch Co., Ltd.

TABLE 1

| | Density (g/cc) | Total pore volume (cm$^3$/g) | Specific surface area (m$^2$/g) | Thermal conductivity (mW/mK) | Linear shrinkage (%) |
|---|---|---|---|---|---|
| Example 1 | 0.16 | 1.873 | 881.6 | 20.1 | 7.5 |
| Example 2 | 0.20 | 1.391 | 779.0 | 18.5 | 15.1 |
| Example 3 | 0.14 | 1.263 | 608.9 | 15.9 | 20.6 |
| Example 4 | 0.15 | 1.208 | 687.1 | 15.9 | 19.8 |
| Example 5 | 0.20 | 1.123 | 588.0 | 19.7 | 5.2 |
| Example 6 | 0.21 | 1.089 | 568.5 | 20.1 | 5.6 |
| Comparative Example 1 | 0.11 | 0.736 | 586.5 | 25.5 | 0.8 |
| Comparative Example 2 | 0.56 | 1.044 | 260.7 | 53.1 | 36.5 |

Referring to Table 1, the representative aerogels according to Examples 1 to 6 have a high surface area, low linear shrinkage, and low thermal conductivity. The aerogel according to Comparative Example 2 has excessive thermal conductivity.

Figure 1:
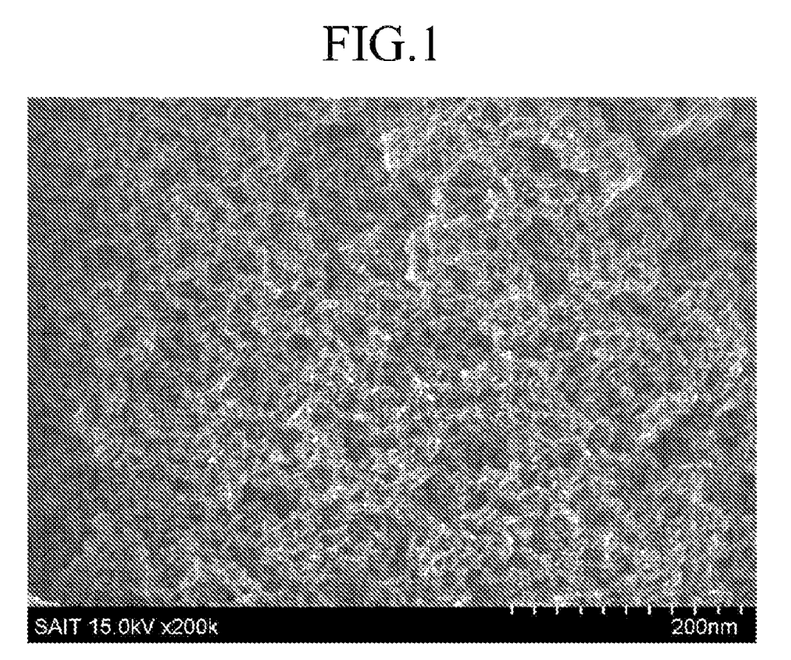
FIGS. 1 to 3 are scanning electron microscope ("SEM") photographs of the representative aerogel prepared according to Example 2, the aerogel of Comparative Example 1, and the aerogel of Comparative Example 2, respectively.
Figure 2:
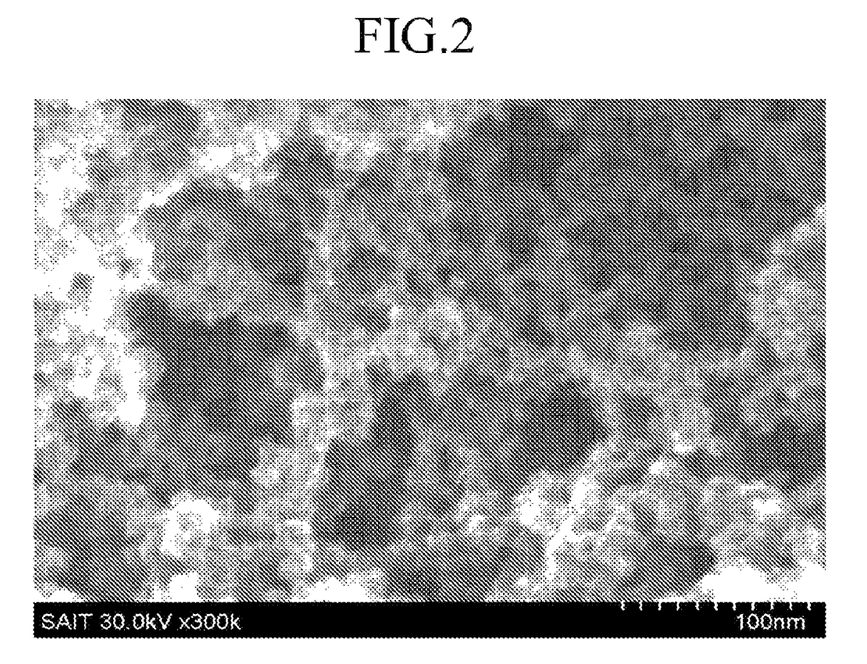
Figure 3:
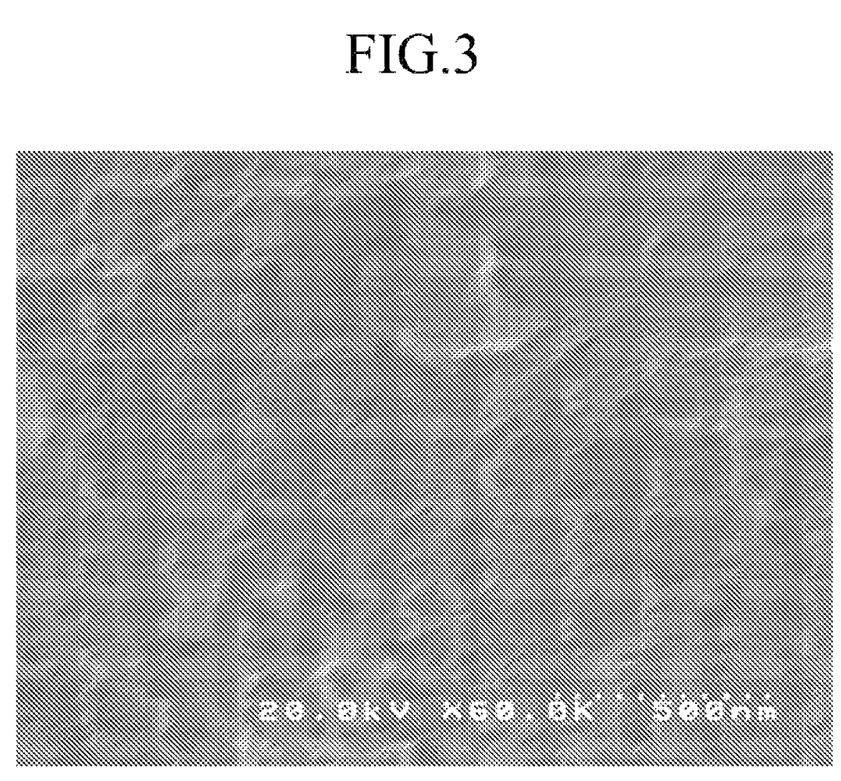

FIGS. 1 to 3 are scanning electron microscope ("SEM") photographs of a representative aerogel prepared according to Example 2 and the aerogels of Comparative Examples 1 and 2, respectively. As shown in FIG. 2, the aerogel prepared using only divinylbenzene has very large pores, while, as shown in FIG. 3, the aerogel prepared using only pentaerythritol tetraacrylate has very small pores. The representative aerogel prepared according to Example 1 has a large number of fine pores (black regions).

While this disclosure has been described in connection with what is presently considered to be practical exemplary embodiments, it is to be understood that the invention is not limited to the disclosed embodiments, but, on the contrary, is intended to include various modifications and equivalent arrangements included within the spirit and scope of the appended claims.

What is claimed is:

1. An aerogel comprising a reaction product of:
one or more first monomers, wherein each first monomer comprises an independently chosen aromatic compound having at least two unsaturated functional groups, and
one or more second monomers, wherein each second monomer is independently represented by the following Chemical Formula 1:

Chemical Formula 1 wherein, in the above Chemical Formula 1, each $X_1$ and $X_2$ is independently a (meth)acrylate group or NR"R', wherein R" and R' are the same or different and are (meth)acryloyl groups, R is a substituted or unsubstituted C1 to C30 alkylene group, a substituted or unsubstituted C6 to C30 arylene group, a substituted or unsubstituted C2 to C30 heteroarylene group, or a combination thereof, each $R_1$, $R_2$, $R_3$, and $R_4$ is independently hydrogen, a substituted or unsubstituted C1 to C10 alkyl group, a substituted or unsubstituted C1 to C10 alkoxy group, $NR_xR_y$, $OR_x$, $NH(CO)R_x$, $OCOR_x$, a substituted or unsubstituted C6 to C18 aryl group, or $CH=CR_x$, wherein each $R_x$ and $R_y$ is independently hydrogen or a substituted or unsubstituted C1 to C10 alkyl group, each m and n is independently an integer ranging from 0 to about 20, provided that when R is an arylene group or a heteroarylene group, each m and n is independently an integer ranging from 3 to about 20, and a and b are independently integers ranging from 0 to 4, provided that a+b is determined according to a valance of R and is 2 or more.

2. The aerogel of claim 1, wherein each aromatic compound comprises a double-bond-containing functional group or a triple-bond-containing functional group.

3. The aerogel of claim 2, wherein the double-bond-containing functional group comprises a substituted or unsubstituted C2 to C10 alkenyl group or a (meth)acrylate group, and the triple-bond-containing functional group comprises a C2 to C10 alkynyl group.

4. The aerogel of claim 1, wherein each aromatic compound comprises a compound represented by the following Chemical Formula 2:

Chemical Formula 2 wherein, in the above Chemical Formula 2,

Ar is a substituted or unsubstituted C6 to C30 arylene group, a substituted or unsubstituted C3 to C30 heteroarylene group, a group including at least two substituted or unsubstituted C6 to C30 arylene groups linked by a single bond or a linker, or a group including at least two substituted or unsubstituted C3 to C30 heteroarylene groups linked by a single bond or a linker, each $Y_1$ and $Y_2$ is independently a double-bond-containing functional group or a triple-bond-containing functional group, and each of p and q is independently an integer ranging from 1 to 5 and p+q is determined by the valance of Ar.

5. The aerogel of claim 1, wherein, in Chemical Formula 1, a+b is an integer ranging from 3 to 6.

6. The aerogel of claim 1, wherein the second monomer is an alkylene di(meth)acrylate, an alkanol penta(meth)acrylate, or N,N'-alkylene-bis-meth)acrylamide.

7. The aerogel of claim 6, wherein the second monomer is ethylene di(meth)acrylate, glycerol (meth)acrylate, 1,4-butanediol (meth)acrylate, 1,6-hexamethylol (meth)acrylate, trimethylolpropyl (meth)acrylate, pentaerythritol tri(meth)acrylate, pentaerythritol tetra(meth)acrylate, dipentaerythritol penta(meth)acrylate, or dipentaerythritol hexa(meth)acrylate.

8. The aerogel of claim 1, wherein the reaction product is prepared from first monomer and second monomer in a weight ratio ranging from about 10:90 to about 90:10.

9. The aerogel of claim 1, wherein the aerogel has pores having a size ranging from about 1 nm to about 100 nm.

10. The aerogel of claim 1, wherein the aerogel has a porosity of about 80 to 99% based on the total volume of the aerogel.

11. The aerogel of claim 1, wherein the specific surface area ranges from about 200 m²/g to about 1000 m²/g.

12. A method of preparing an aerogel, comprising:
mixing
one or more first monomers, wherein each first monomer comprises an independently chosen aromatic compound having at least two unsaturated functional groups, and
one or more second monomers, wherein each second monomer comprises at least two groups independently chosen from (meth)acrylate groups and NR"R' (where R" and R' are the same or different, and are (meth)acryloyl groups),
in a solvent to obtain a mixture,
reacting the mixture to obtain a wet gel, and
drying the wet gel.

13. The method according to claim 12, wherein each aromatic compound comprises a double-bond-containing functional group or a triple-bond-containing functional group.

14. The method according to claim 13, wherein the double-bond-containing functional group comprises a substituted or unsubstituted C2 to C10 alkenyl group or a (meth)acrylate group, and the triple-bond-containing functional group comprises a C2 to C10 alkynyl group.

15. The method according to claim 12, wherein each aromatic compound comprises a compound represented by the following Chemical Formula 2:

Chemical Formula 2 wherein, in the above Chemical Formula 2,

Ar is a substituted or unsubstituted C6 to C30 arylene group, a substituted or unsubstituted C3 to C30 heteroarylene group, a group including at least two substituted or unsubstituted C6 to C30 arylene groups linked by a single bond or a linker, or a group including at least two substituted or unsubstituted C3 to C30 heteroarylene groups linked by a single bond or a linker, each $Y_1$ and $Y_2$ is independently a double-bond-containing functional group or a triple-bond-containing functional group, and each of p and q is independently an integer ranging from 1 to 5 and p+q is determined by the valance of Ar.

16. The method according to claim 12, wherein the second monomer is an alkylene di(meth)acrylate, an alkanol penta(meth)acrylate, or N,N'-alkylene-bis-meth)acrylamide.

17. The method according to claim 16, wherein the second monomer is ethylene di(meth)acrylate, glycerol (meth)acrylate, 1,4-butanediol (meth)acrylate, 1,6-hexamethylol (meth)acrylate, trimethylolpropyl (meth)acrylate, pentaerythritol tri(meth)acrylate, pentaerythritol tetra(meth)acrylate, dipentaerythritol penta(meth)acrylate, or dipentaerythritol hexa(meth)acrylate.

18. The method according to claim 12, wherein the aerogel is prepared from the first monomer and the second monomer in a weight ratio ranging from about 10:90 to about 90:10.

19. The method according to claim 12, wherein the aerogel has pores having a size ranging from about 1 nm to about 100 nm.

20. The method according to claim 12, wherein the aerogel has a porosity of about 80 to 99% based on the total volume of the aerogel.

21. The method according to claim 12, wherein the aerogel has a specific surface area ranging from about 200 m$^2$/g to about 1000 m$^2$/g.

* * * * *